United States Patent

Jaisingh et al.

[11] Patent Number: 6,009,096
[45] Date of Patent: Dec. 28, 1999

[54] WIRELESS SERVICES DISTRIBUTION SYSTEM

[75] Inventors: Gopal K. Jaisingh, Montville; Robert Edward Schroeder, Township of Morris, Morris County, both of N.J.

[73] Assignee: AT&T Corp., New York, N.Y.

[21] Appl. No.: 08/683,338

[22] Filed: Jul. 18, 1996

Related U.S. Application Data

[63] Continuation-in-part of application No. 08/393,784, Feb. 24, 1995, Pat. No. 5,600,633, and application No. 08/367,402, Dec. 30, 1994, Pat. No. 5,574,966.

[51] Int. Cl.$^6$ ...................................................... H04B 1/66
[52] U.S. Cl. ................................................ 370/395; 370/474
[58] Field of Search .................................... 370/277, 395, 370/396, 397, 465, 466, 467, 474, 349, 401, 404, 338; 348/7, 12, 471, 466, 467; 455/4.2, 5.1, 3.1, 6.1, 6.3, 561, 562; 395/200.5

[56] References Cited

U.S. PATENT DOCUMENTS

| | | | |
|---|---|---|---|
| 5,406,550 | 4/1995 | McTiffin | 370/395 |
| 5,420,858 | 5/1995 | Marshall et al. | 370/395 |
| 5,535,423 | 7/1996 | Dupuy | 455/562 |
| 5,574,966 | 11/1996 | Barzegar et al. | 348/13 |
| 5,592,470 | 1/1997 | Rudrapatna et al. | 370/320 |
| 5,600,633 | 2/1997 | Jaisingh et al. | 370/277 |
| 5,613,191 | 3/1997 | Hylton et al. | 370/342 |
| 5,638,371 | 6/1997 | Raychaudhuri et al. | 370/395 |
| 5,648,969 | 7/1997 | Pasternak et al. | 370/474 |
| 5,661,723 | 8/1997 | Ueno et al. | 370/338 |

*Primary Examiner*—Chau T. Nguyen

[57] ABSTRACT

A wireless base station having sectorized distribution and omni-distribution of services is combined with ATM processing. Both narrowband and broadband services can be provided to fixed and mobile wireless subscribers by a flexible intelligent ATM base station. Two way integrated voice, wireless data, wireless multimedia, and compressed video services to a wireless subscriber using different narrowband and wideband common air interfaces. Uplink service includes narrowband signaling and bearer information signaling. A wireless base station can transmit a variety of omnidirectional services to all subscribers within a service area and can transmit certain services to a sector of the service area, that is to particular subscribers.

17 Claims, 6 Drawing Sheets

WIRELESS SERVICES DISTRIBUTION SYSTEM

This application is a continuation-in-part of U.S. patent application Ser. No. 08/393,784 entitled "Wireless Telecommunications Base Station For Integrated Wireless Services With ATM Processing" filed Feb. 24, 1995, now U.S. Pat. No. 5,600,633, and U.S. patent application Ser. No. 08/367,402 entitled "A Wireless Base Station Architecture" filed Dec. 30, 1994, now U.S. Pat. No. 5,574,966, which are both incorporated herein by reference.

FIELD OF INVENTION

The present invention relates to a system for providing wireless services to both fixed and mobile subscriber locations, and more particularly to a combined ATM (asynchronous transfer mode) system and radioport architecture for providing multimedia services.

BACKGROUND OF INVENTION

Telecommunications systems have been developed to deliver multimedia services to residential and commercial subscribers using wireless access systems. In one system, a wireless base station transmits multimedia services to multiple subscribers in a service area. The base station provides both sectorized and omnidirectional antennas for RF communication. For example, common services such as broadcast television may be transmitted to all subscribers in a service area via an omni-directional antenna. Also, subscriber-specific services intended for less than all the subscribers may be transmitted via a sectorized antenna. Video, audio, and data signals are sectorized and combined prior to transmission through the antenna which covers the service area and distributes the signals. Such a system is shown in commonly assigned U.S. patent application Ser. No. 08/367,402, entitled "A Wireless Base Station Architecture" filed Dec. 30, 1994, now U.S. Pat. No. 5,574,966.

Asynchronous transfer mode (ATM) signaling and bearer information process systems can provide important flexibility to various communications systems. ATM cell transport also provides flexible bandwidth allocation and service type selection for a wide range of applications, efficient multiplexing of traffic from bursty data/multimedia sources, end-to-end provisioning of broadband services over wireless and land line networks, suitable ATM switching equipment for inter cell switching, and improved service reliability with packet switching techniques. Thus, it is desirable to enable wireless devices to be connected to an ATM signaling and processing network to achieve greater flexibility. One system which achieves this flexibility is described in commonly assigned U.S. patent application Ser. No. 08/393,784, now U.S. Pat. No. 5,600,633, entitled "Wireless Telecommunications Base Station For Integrated Wireless Services With ATM Processing" filed Feb. 24, 1995.

Each of the above described communications systems provides significant advantages. Each individual communication system however, does not realize the benefits of the other system. It would be desirable to develop a communication system which can realize the benefits of both systems, and more particularly maximize the efficiency and versatility of the communication system.

SUMMARY OF INVENTION

The present invention combines a wireless transmitting and receiving base station having a sectorized and omni-distribution RF system with an ATM signaling and bearer information processor.

One advantage of the present invention is that a wide variety of narrowband and broadband services can be provided to fixed and mobile wireless stations by a flexible intelligent ATM base station. Two-way integrated voice, wireless data, wireless multimedia, and compressed video services can be provided to a wireless subscriber using different narrowband and wideband common air interfaces (CAI).

Another benefit provided by the present invention is that a wireless base station architecture can transmit a variety of omni directional services to all subscribers within a service area and transmit certain subscriber-specific services to a sector or subset of subscribers in service area. In one embodiment, the sector signals can be combined with the omni-directional signal to satisfy specific needs and prepare the signals for transmission. Similarly, differing sector signals and omni-directional signals may be combined prior to RF transmission to meet specific needs.

By having these services provided from a single base station, the number of base stations required to deliver multiple services can be significantly reduced, resulting in more efficient use of the available RF frequency spectrum.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

An illustrative wireless system according to the present invention will be described with reference to FIG. 1. A base station 201 is coupled to a local and/or wide area network 203 via a link 255. The link 255 may be hardwired or wireless. The local and wide area network 203 may include, but is not limited to, local and long distance telephone networks, private and public data networks, broadcast television networks, and interactive video networks. A service region 111 is defined for the base station 201. Many subscribers may be located in the service region 111 including, among others, a personal communicator 124 and residential and commercial buildings 121-1, 121-2, 121-3, 121-4 with RF receiving and transmitting antennas 123-1, 123-2, 123-3, 123-4, respectively. The buildings 121-1 to 121-4 and personal communicator 124 each have access to multimedia services including audio, video and data services via RF communication with base station 201 and its antenna system 103. It is to be understood that personal communicator 124 may be of many forms of personal communication devices including, but not restricted to, a portable television, a wireless audio video phone, and a pager.

Figure 1:
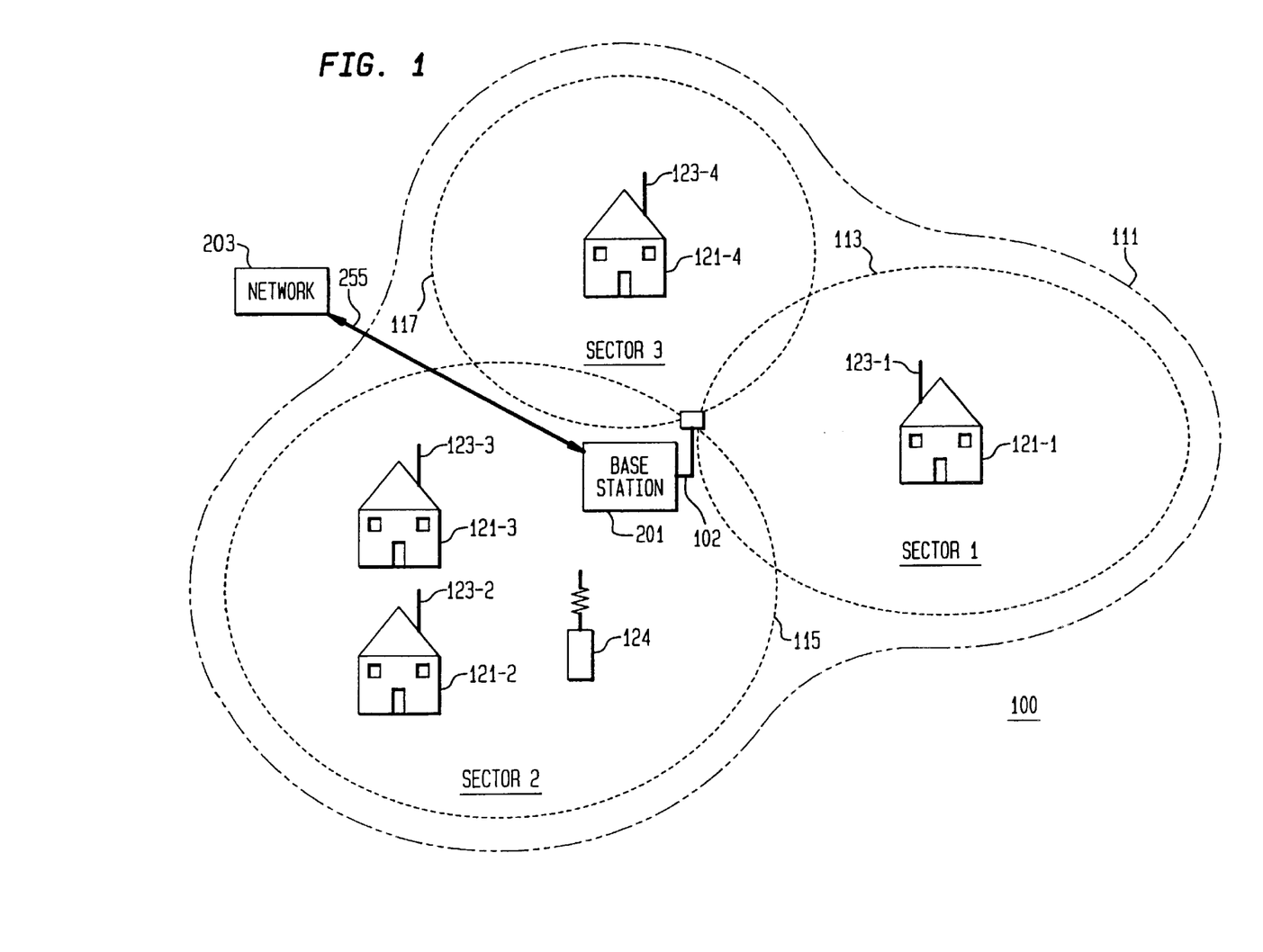
FIG. 1 shows an illustrative service area for a wireless base station according to the present invention.

The service region 111 may include sub set service areas or sectors, for example sector 1, sector 2 and sector 3 identified by 113, 115, 117 in FIG. 1, respectively. A more detailed description of the operation of the elements of FIG. 1 can be found in commonly assigned copending U.S. patent application Ser. No. 08/367,402, entitled "A Wireless Base Station Architecture" filed Dec. 30, 1994, which is incorporated herein by reference.

Figure 2A:
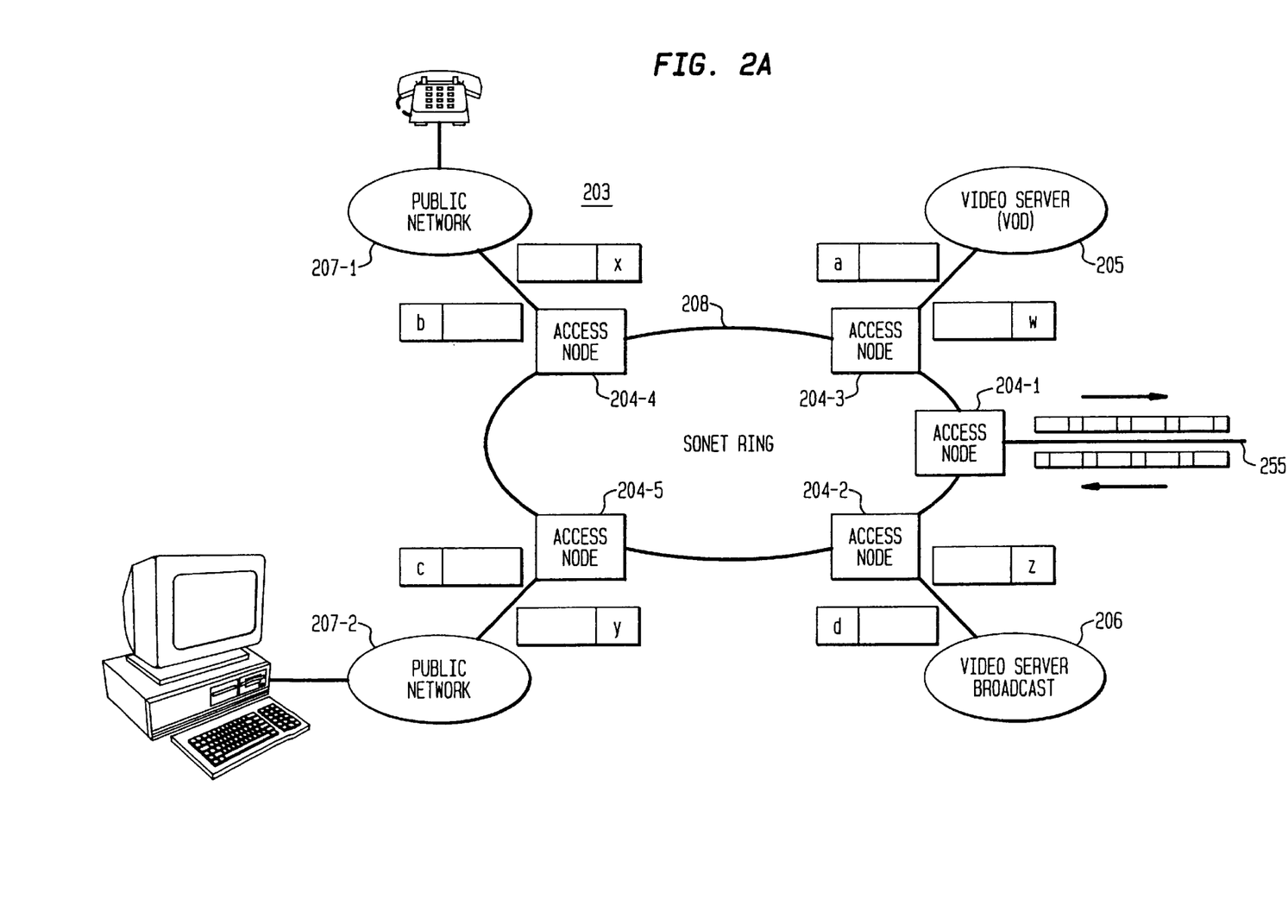
FIGS. 2a and 2b together show an illustrative flexible intelligent ATM base station connected to an ATM network according to the present invention.
Figure 2B:
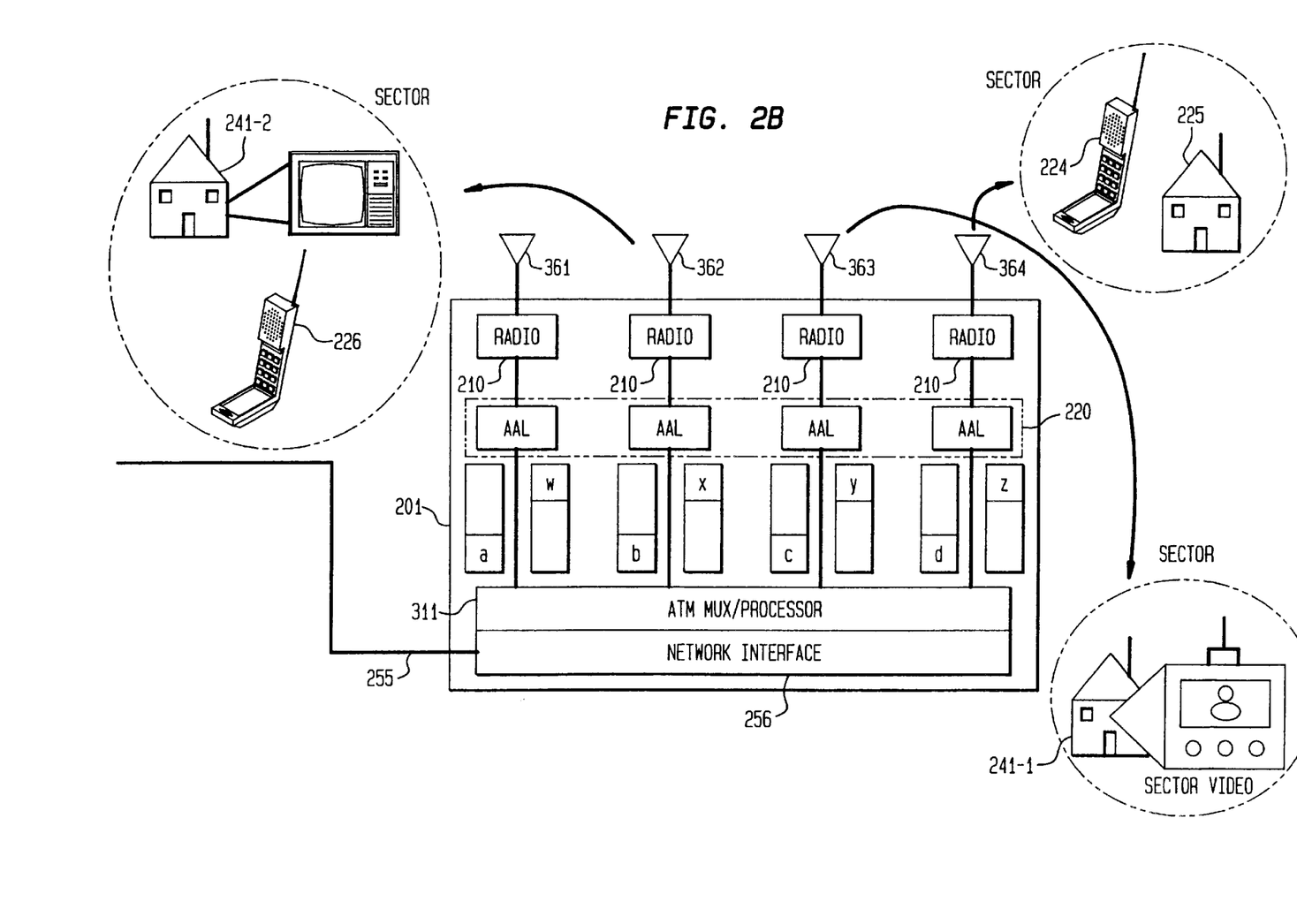

FIGS. 2a and 2b together illustrate a wireless communication system. A network 203 in FIG. 2a is coupled to the base station 201 in FIG. 2b via a trunk connection 255. The network 203 is an ATM network in which data is transmitted in ATM format wherein the data is divided into small, fixed length units called cells. Each cell typically contains 53 bytes including a 5-byte header comprising identification, control priority and routing information, and up to 48 bytes of payload. It is to be understood that the present invention can be easily adapted to operate with different length ATM formats. The network 203 includes a backbone access ring, such as a sonet ring 208. The sonet ring 208 joins together a plurality of access nodes 204-1, 204-2, 204-3, 204-4, 204-5. The access nodes 204-2, 204-3, 204-4, 204-5 provide other elements, such as video on demand (VOD) servers 205, broadcast video servers 206, and other public networks 207-1, 207-2, access to the network 203. Access node 204-1 is an ATM node that connects the ATM network 203 to the base station 201 by trunk 255 and network interface 256.

The network 203 preferably provides actual data in a digital bit stream downstream to the base station 201. The digital bit stream can include, among other forms of data, at least one common broadcast video signal, at least one sectorized video signal, and at least one sectorized audio signal. Each broadcast video signal may be a unidirectional downstream signal such as a network television signal. Each sectorized video signal may have a unidirectional downstream video signal with an upstream data signal. A sectorized video signal may contain services including, but not limited to, interactive video games and VOD services. Each sectorized audio signal can be bidirectional and may include both a downstream audio channel and an upstream audio channel. Typical sectorized audio services may include common telephone service or narrowband ISDN service. Alternatively, audio services may be broadcast unidirectional signals analogous to commercial broadcast radio. The network 203 also may accept upstream ATM signals from the base station 201 wherein the actual data carries upstream data and audio signals to, for example, a video server.

The base station 201 includes a microport transceiver 210 which communicates via a common air interface (CA) through omni antenna 361, and sector antennas 362, 363, 364 with a plurality of wireless subscriber units 224, 225, 226. Residential units 241-1 and 241-2 receive wireless signals via the CAI for one or more subscribing units located therein. The network interface 256 is coupled to ATM mux processor 311 which is coupled to the microport transceiver via ATM adaptation layers (AAL) 220. AALs provide mechanisms for supporting transport protocols over ATM cells.

Examples of voice, data, and video services served by omni antenna 361 along with sector antennas 362, 363, 364 are represented by end user devices 224, 226, and video devices 241-1, 241-2. Omni antenna 361 serves all the sectors in a broadcast configuration while antennas 362, 363, 364 provide sector unique services.

Figure 3:
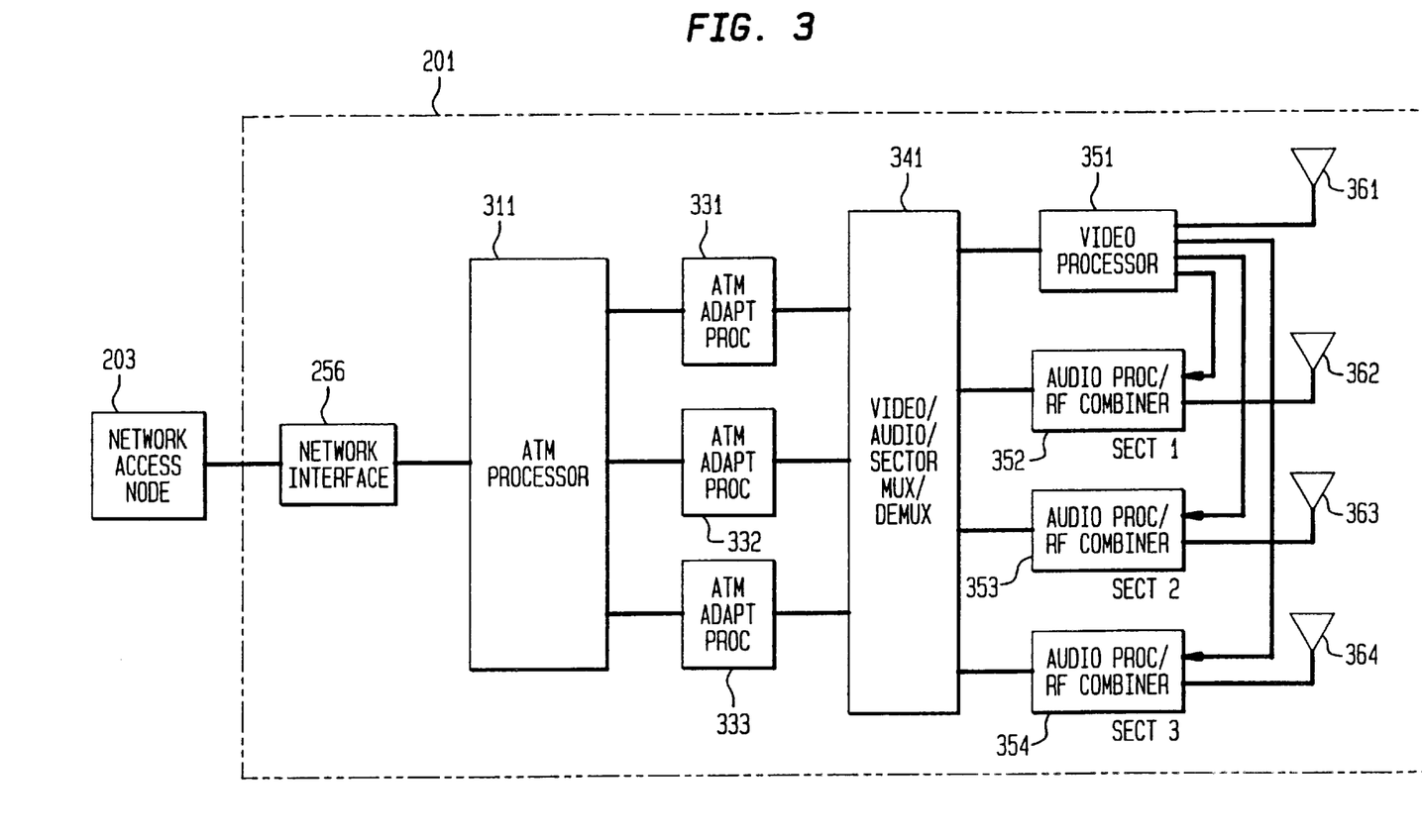
FIG. 3 shows a system including an illustrative base station coupled to an ATM access node of an ATM network according to the present invention.

A more detailed representation of an illusive base station 201 is shown in FIG. 3 and will be described with reference thereto. The base station 201 includes an ATM processor 311 connected to the network 203 via network interface 256. The network interface 256 passes digital bit streams in ATM cell format from the network 203 to the ATM processor 311. The ATM processor 311 forwards the digital bit streams to three ATM adaptation processors 331, 332, 333. The ATM adaptation processors 331, 332, 333 convert the digital bit streams in ATM cell format into an appropriate air interface signaling and bearer information stream, and more specifically into appropriate digital bit streams for further processing. The adaptation processors 331, 332, 333 pass the converted digital bit streams to the video, audio and sector multiplexer/demultiplexer 341.

The multiplexer/demultiplexer 341 splits the signals from the ATM adaptation processors 331, 332, 333 into video, audio, and sector signals, and delivers these signals to the appropriate RF processor including the video processor 351 and audio processor RF combiners 352, 353, 354 which direct the outgoing signals to different broadcast sectors. In an illustrative embodiment, one audio processor RF combiner exists for each sector serviced by the base station. The video processor 351 prepares both broadcast and sectorized video signals for transmission. The broadcast video signals are transmitted to subscribers via a radiative antenna 361. Antenna 361 may include one or more of the antennas 362, 363, 364 to broadcast its respective signal to one or more or all the sectors. Similarly, antenna 361 may be designed to receive a reverse direction signal from one or more of the sectors. Each audio processor RF combiner 352, 353, 354 receives sectorized audio signals and prepares the same for RF transmission to a predefined sector via respective antennas 362, 363, 364. Also, each audio processor RF combiner 352, 353, 354 can receive a sectorized video signal from video processor 351 and combine the same with its own sectorized audio signal for transmission via the corresponding antenna 362, 363, 364. In the event that sectorized video signals, without audio signals, are to be transmitted to subscribers, the sectorized video signals may pass through the appropriate audio processor RF combiner and its corresponding antenna, or alternatively, a directional antenna, for each sector, may be directly coupled to the video processor 351 for sectorized video transmission.

Figure 4A:
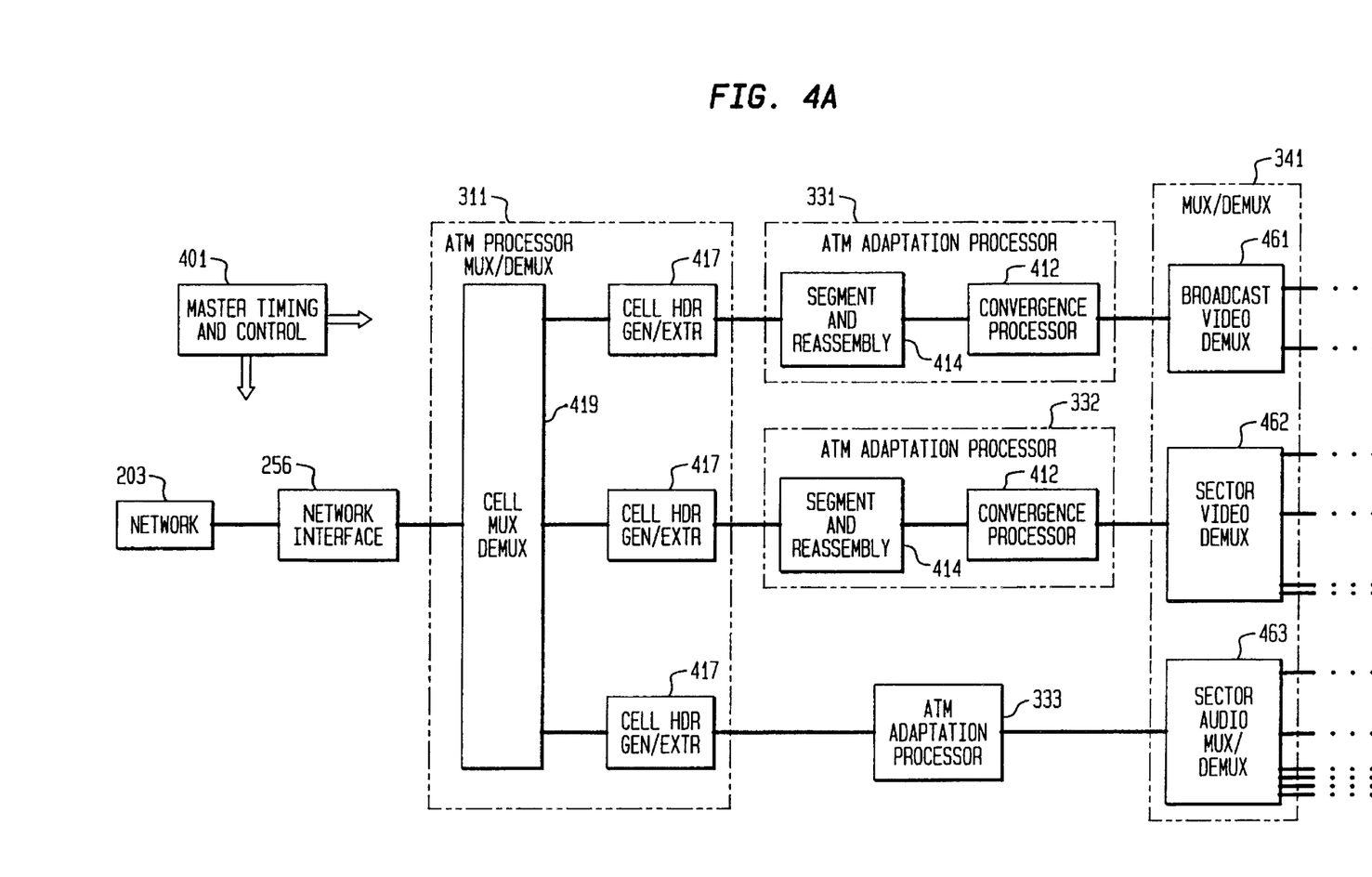
FIGS. 4a and 4b show a more detailed representation of the system of FIG. 3 according to the present invention.
Figure 4B:
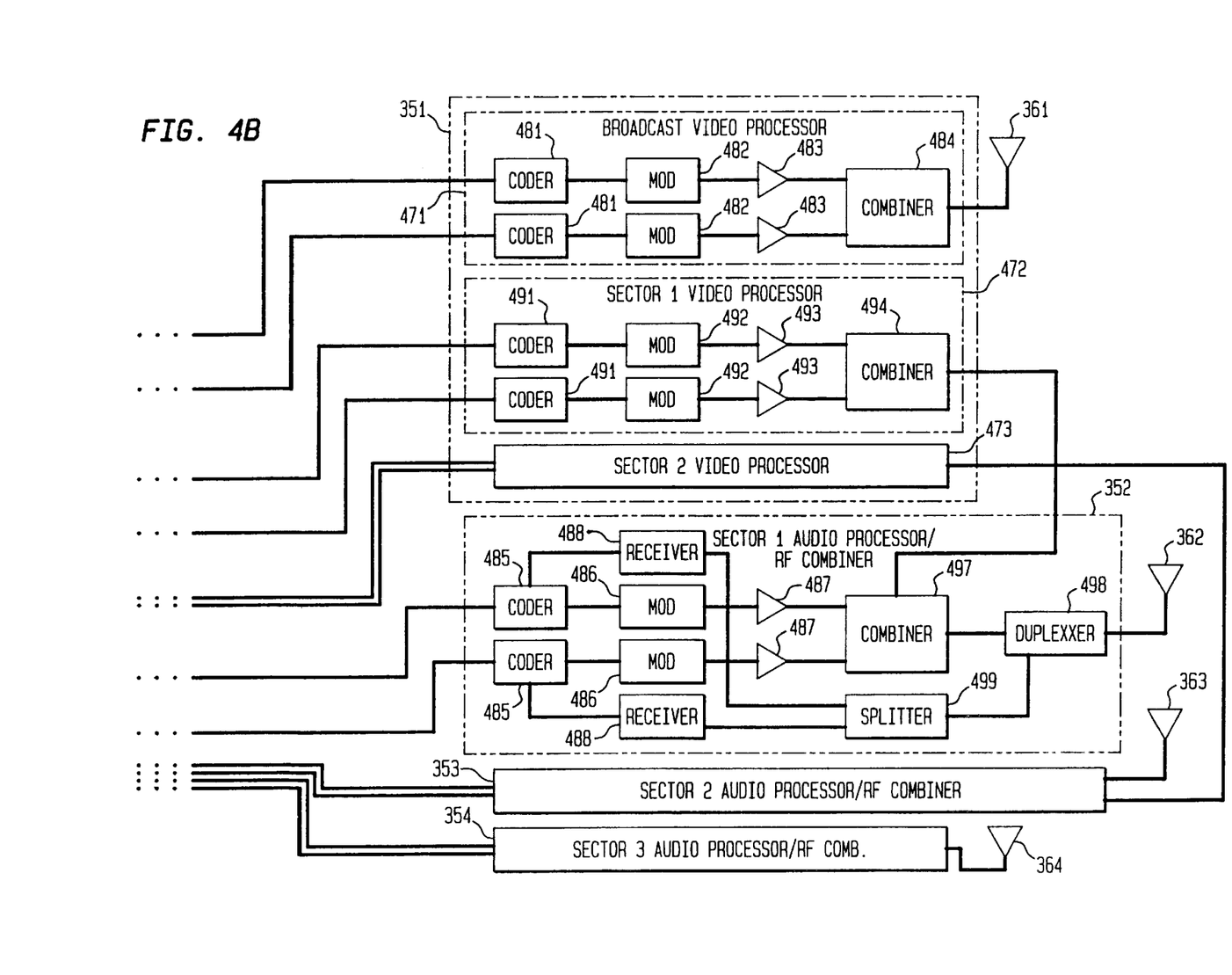

FIGS. 4a and 4b provide a detailed representation of the system in FIG. 3. A similar system is found in commonly assigned copending U.S. patent application Ser. No. 08/393, 784, entitled "Wireless Telecommunications Base Station For Integrated Wireless Services With ATM Processing" filed Feb. 24, 1995, now U.S. Pat. No. 5,600,633, and incorporated herein by reference. Master timing and control 401 is common to and controls the signal flow and timing of the signal flow throughout the base station 201. The land line network 203 is coupled to the network interface 256 which is connected to the ATM processor 311. The network interface 256 typically provides functions such as framing the ATM cell stream for the network 203 being used (e.g., SONET OC3) and bit timing, and electro-optical interfaces for the specific physical medium employed.

The ATM processor 311 includes a cell multiplexer/demultiplexer (mux/demux) 419 connected to a plurality of cell handling generator and extractor circuits 417. The cell mux/demux 419 combines ATM cells from different radio systems in an uplink mode to form an ATM cell stream and demultiplexes an ATM cell stream into multiple ATM cells received from the network 203 in a downlink mode. Radio systems may include both audio and video sector portions of a service from one or more subscribers.

The generator and extractor circuits 417 are connected to the ATM adaptation processors 331, 332, 333. The generator and extractor circuits 417 add the appropriate ATM header to the payload to form 53 byte ATM cells in the uplink direction. In the downlink direction, the generator and extractor circuits 417 extract headers from the ATM cells leaving the payload or data portion of the ATM cells.

The ATM adaptation processors 331, 332, 333 convert the payload of the ATM cells output from ATM processor 311 into radio baseband video, voice and data streams in a downlink mode and convert radio baseband video, voice and data streams into the payload of an ATM cell in the uplink mode. The ATM adaptation processors 331, 332, 333 each include a segmentation and reassembly processor (SAR) 414 and a convergence processor 412. SAR 414 receives individual ATM cell payloads and converts the payloads into convergence protocol data units (PDUs) in the downlink mode, and more particularly assembles the received ATM payload into larger packets for processing by the convergence processor 412. In the uplink mode, SAR 414 converts received PDUs into an ATM cell payload, and more particularly, breaks down PDUs into smaller packets and adds error correction and sequencing fields and generates ATM payload packets corresponding to the ATM adaptation layer suitable for the service being provided. In the downlink mode, convergence processor 412 converges the small packets or PDUs from the SAR 414 into larger frames or packets of, for example, bit streams of audio, video, and data to obtain appropriate PDUs to be used as baseband inputs to the appropriate radio. In the uplink mode, the convergence processor 412 breaks down a big frame or packet of user PDUs into small packets of appropriate length for convergence into an ATM cell payload.

ATM adaptation processors 331, 332, 333 are coupled to the video, audio and sector multiplexer/demultiplexer (mux/demux) 341. The mux/demux 341, according to an exemplary embodiment, includes a broadcast video demux 461, at least one sector video demux 462, and at least one sector audio mux/demux 463. In the illustrative embodiment shown in FIG. 4a, the adaptation processors 331, 332, 333 are coupled to the broadcast video demux 461, sector video demux 462, and sector audio mux/demux 463, respectively. Broadcast video demux 461 receives a video information stream from ATM adaptation processor 331 in the form of a stream of PDUs and demultiplexes the video information stream for various channel coders of the broadcast video processor required for the level of service. Sector video demux 462 receives information in the form of a stream of PDUs from ATM adaptation processor 332 and demultiplexes the received information for coders in the corresponding sector video processor.

In the downlink mode, sector audio mux/demux 463 receives information in the form of a stream of user PDUs from ATM adaptation processor 333 and demultiplexes the received information for coders in the sector audio processor RF combiners. In the uplink mode, sector audio mux/demux 463 receives coded information from the coders in the sector audio processor RF combiners and multiplexes the coded information into a single stream of PDUs that is passed to the corresponding adaptation processor 333 for further processing and transmission to the ATM network.

Broadcast video demux 461 is coupled to broadcast video processor 471 of video processor 351. Broadcast video processor 471 includes multiple channels each having a coder 481, a modulator 482, and an amplifier 483. A combiner 484 combines RF from amplifiers 483 and feeds the same to omni RF antenna 361. Broadcast video processor 471 broadcasts signals to subscribers via antenna 361.

Sector video demux 462 is coupled to sector video processors, for example, sector 1 video processor 472 and sector 2 video processor 473 of video processor 351. Sector 1 video processor 472 includes multiple channels each having a coder 491, a modulator 492, and an amplifier 493. A combiner 494 combines RF from amplifiers 493 and feeds the same to combiner 497 in sector audio processor RF combiner 352 for transmission through sector antenna 362. Other sector video processors (e.g., 473) have similar channel components (not shown) to process, transmit and receive video for their corresponding sectors. Thus, a sector n (n being an integer >1) video processor has a combiner which connects each channel therein to a sector n audio processor RF combiner.

Sector audio mux demux 463 is connected to sector audio processor RF combiners, for example, sector 1 audio processor RF combiner 352, sector 2 audio processor RF combiner 353, and sector 3 audio processor RF combiner 354. Each sector audio processor RF combiner 352, 353, 354 provides for bidirectional communication and includes duplex channels each having a coder 485, a modulator 486, a receiver 488, a splitter 499, and an amplifier 487. A combiner 497 combines multiple channels and the sector video RF from combiner 494 and forwards the same to duplexer 498, which feeds the combined sector signals to sector antenna 362 for transmission. Incoming uplink signals in the sector served by audio processor RF combiner 352 are received by the antenna 362, separated by the duplexer 498 and sent to a splitter 499. The splitter 499 couples the incoming signals to the appropriate receivers 488. The signals are subsequently passed to the coder 485 and upstream through the system to the mux/demux 341. In an alternative embodiment, the sector video processors 472, 473 may contain similar receiving circuitry, as the sector audio processor RF combiners, for processing uplink video received from the subscribers.

Sector 1 video processor 472 may pass sectorized video to combiner 497 of sector 1 audio processor RF combiner. Sector 1 audio processor RF combiner 352 can combine sectorized video from sector 1 video processor 472 and its own sectorized audio for transmission to subscribers. Similarly, each other sector audio processor RF combiner 353, 354, etc. can also be coupled to a corresponding video processor for sectorized distribution of multimedia services to subscribers in the sector.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. In a multi-service distribution system using ATM format signaling including a plurality of subscribers and an ATM network, a base station comprising:

a sector processor for receiving RF signals from at least one subscriber in a predefined sector of a service area served by the base station and recovering user protocol data units from the RF signals, said RF signals carrying subscriber data in a format exclusive of ATM cells;

a sector multiplexer, connected to said sector processor for combining sectorized signals in the form of user protocol data units into a stream of user protocol data units;

an ATM adaptation processor, coupled to said sector processor, for converting the user protocol data units into an ATM cell payload;

a generator circuit, coupled to said ATM adaptation processor, for generating an ATM cell header and combining the ATM cell header with the ATM cell payload to form an ATM cell;

an ATM multiplexer, coupled to said generator circuit, for multiplexing the ATM cell with other ATM cells to form an ATM cell stream; and a network interface, coupled to said ATM multiplexer, for transmitting the ATM cell stream to the network.

2. The base station according to claim 1, wherein the RF signals include audio signals.

3. The base station according to claim 2, wherein the RF signals include video signals.

4. The base station according to claim 1, wherein the RF signals include video signals.

5. In a multi-service distribution system using ATM format signaling including a plurality of subscribers and an ATM network, a base station comprising:

an ATM demultiplexer for demultiplexing ATM cell streams received from the network into a plurality of ATM cells;

an extractor circuit, coupled to said ATM demultiplexer, for extracting cell headers from ATM cells leaving ATM cell payloads;

an ATM adaptation processor, coupled to said extractor circuit, for converting the ATM cell payloads into user protocol data units; and a transmission processor, coupled to said ATM adaptation processor, for transmitting user protocol data units as first RF signals to at least one subscriber, said transmission processor including, a broadcast processor for transmitting user protocol data units as first RF signals to all subscribers within a service area of the base station; and a sector processor for transmitting user protocol data units as first RF signals to at least one subscriber in a predefined sector of the service area of the base station.

6. The base station according to claim 5, wherein the first RF signals transmitted by said broadcast processor include video signals.

7. The base station according to claim 5, wherein the RF signals transmitted by said sector processor includes audio and video signals, and wherein said sector processor combines audio and video signals in the RF signals for multimedia services.

8. The base station according to claim 5 further comprising a demultiplexer, coupled between said adaptation processor and said transmission processor, for receiving a stream of user protocol data units from said adaptation processor, said demultiplexer including a broadcast demultiplexer for demultiplexing a broadcast stream of the user protocol data units for broadcast transmission, and passing the demultiplexed broadcast user protocol data units to said broadcast processor, and a sector demultiplexer for demultiplexer a sector stream of the user protocol data units for sectorized transmission, and passing the demultiplexed sectorized user protocol data units to said sector processor.

9. The base station according to claim 8, wherein said sector demultiplexer includes a plurality of sector multiplexers, at least one for each sector in the base station service area.

10. The base station according to claim 5, wherein said sector processor receives second RF signals from at least one subscriber in the predefined sector and recovers second user protocol data units from the second RF signals, and wherein said ATM adaptation processor obtains a second ATM cell payload from the second user protocol data units, said base station further comprising:

a generator circuit, coupled to said ATM adaptation processor, for generating a second ATM cell header and combining the second ATM cell header with the second ATM cell payload to form a second ATM cell;

an ATM multiplexer, coupled to said generator circuit, for multiplexing the second ATM cell with other ATM cells to form a second ATM cell stream; and a network interface, coupled to said ATM multiplexer, for transmitting the second ATM cell stream to the network.

11. The base station according to claim 10, wherein the first and second RF signals include audio signals.

12. The base station according to claim 11, wherein the first RF signals include video signals.

13. The base station according to claim 10, further comprising a multiplexer demultiplexer, coupled between said adaptation processor and said transmission processor, including a broadcast demultiplexer for demultiplexing a broadcast stream of the first user protocol data units for broadcast transmission, and passing the demultiplexed broadcast user protocol data units to said broadcast processor, a sector demultiplexer for demultiplexing a sector stream of the first user protocol data units for sectorized transmission, and passing the demultiplexed sectorized user protocol data units to said sector processor, and a sector multiplexer, connected between said sector processor and said adaptation processor, for combining sectorized signals in the form of the second user protocol data units into a stream of the second user protocol data units.

14. In a multi-service distribution system using ATM format signaling including a plurality of subscribers and an ATM network, a base station comprising:

a sector processor for receiving RF signals from at least one subscriber in a predefined sector of a service area served by the base station and recovering user protocol data units from the RF signals;

a sector multiplexer, connected to said sector processor for combining sectorized signals in the form of user protocol data units into a stream of user protocol data units;

an ATM adaptation processor, coupled to said sector multiplexer, for converting the user protocol data units into an ATM cell payload;

a generator circuit, coupled to said ATM adaptation processor, for generating an ATM cell header and combining the ATM cell header with the ATM cell payload to form an ATM cell;

an ATM multiplexer, coupled to said generator circuit, for multiplexing the ATM cell with other ATM cells to form an ATM cell stream; and a network interface, coupled to said ATM multiplexer, for transmitting the ATM cell stream to the network.

15. The base station according to claim 14, wherein the RF signals include audio signals.

16. The base station according to claim 15, wherein the RF signals include video signals.

17. The base station according to claim 14, wherein the RF signals include video signals.

* * * * *